(12) United States Patent
Banks (10) Patent No.: US 10,325,279 B2
(45) Date of Patent: Jun. 18, 2019

(54) PREFERENCE BASED DATA COLLECTION AND DISCOUNTING SYSTEM

(71) Applicant: Celia B. Banks, Las Vegas, NV (US)

(72) Inventor: Celia B. Banks, Las Vegas, NV (US)

( * ) Notice: Subject to any disclaimer, the term of this patent is extended or adjusted under 35 U.S.C. 154(b) by 46 days.

(21) Appl. No.: 16/102,248

(22) Filed: Aug. 13, 2018

(65) Prior Publication Data

US 2019/0057413 A1    Feb. 21, 2019

Related U.S. Application Data

(63) Continuation of application No. 16/001,254, filed on Jun. 6, 2018, which is a continuation of application No. 15/497,581, filed on Apr. 26, 2017, now abandoned.

(60) Provisional application No. 62/331,422, filed on May 3, 2016.

(51) Int. Cl.
| | |
|---|---|
| *G06Q 30/00* | (2012.01) |
| *G06Q 30/02* | (2012.01) |
| *G06Q 20/20* | (2012.01) |
| *G06Q 30/06* | (2012.01) |
| *G06Q 20/38* | (2012.01) |

(52) U.S. Cl.
CPC ....... *G06Q 30/0236* (2013.01); *G06Q 20/201* (2013.01); *G06Q 20/204* (2013.01); *G06Q 20/208* (2013.01); *G06Q 20/387* (2013.01); *G06Q 30/0201* (2013.01); *G06Q 30/0224* (2013.01); *G06Q 30/0238* (2013.01); *G06Q 30/0633* (2013.01)

(58) Field of Classification Search
CPC ............. G06Q 30/0236; G06Q 20/201; G06Q 20/204; G06Q 20/208; G06Q 30/0201; G06Q 30/0224; G06Q 30/0238; G06Q 30/0633
USPC ....................................................... 705/14.36
See application file for complete search history.

(56) References Cited

U.S. PATENT DOCUMENTS

| | | | |
|---|---|---|---|
| 6,516,302 B1 * | 2/2003 | Deaton ................... | G06Q 20/20 705/14.38 |
| 2015/0058154 A1 * | 2/2015 | Appleyard .......... | G06Q 30/0633 705/26.4 |
| 2015/0134442 A1 * | 5/2015 | Shekhar ............. | G06Q 30/0239 705/14.39 |
| 2016/0239862 A1 * | 8/2016 | Kwak ................. | G06Q 30/0233 |
| 2017/0255988 A1 * | 9/2017 | Calio ................. | G06Q 30/0633 |

FOREIGN PATENT DOCUMENTS

WO   WO-2014084478 A1 *   6/2014   ............ G06Q 30/02

OTHER PUBLICATIONS

Bodea, Ferguson, Pricing Segmentation and Analytics, 2012, Business Expert Press, p. 45-48 (Year: 2012).*

*Primary Examiner* — Michael Bekerman
*Assistant Examiner* — Michael J Cross (57) ABSTRACT

The preference-based data collection and discounting system and methods herein collect consumer product preferences and track the buying habits of a consumer and reward consumers through discounts. The buying habits may be interrogated by a database of one or more algorithms, which will result in a collated database about consumer buying habits. This metadata may be used by vendors to make marketing assumptions that will influence a consumer's future purchase decisions. Consumers directly input and update their preferences as well.

16 Claims, 7 Drawing Sheets

Customer Data

| Gender | Top Area | Amount | Top Brand |
|---|---|---|---|
| Male | Auto | 187000 | Maserati |
| Female | Handbags | 52500 | Hermes |
| Female | Handbags | 157000 | Hermes |
| Female | Handbags | 43000 | Hermes |
| Female | Kids | 375 | Baby Phat |

FIG. 9

PREFERENCE BASED DATA COLLECTION AND DISCOUNTING SYSTEM

CROSS-REFERENCE TO RELATED APPLICATION

This application claims priority to U.S. Provisional Patent Application No. 62/331,422, filed May 3, 2016, and U.S. Utility patent application Ser. No. 15/497,581 filed on Apr. 26, 2017

APPLICATION IS MISSING CONTINUITY TO PARENT APPLICATION SER. NO. 15/497,581

Through a series of mishaps involving predominately attorney errors in filing have not shown that this application Ser. No. 16/102,248 properly links to parent application Ser. No. 15/497,581. Parent application Ser. No. 15/497,581 went abandoned because it did not show further response to it. Table A below is a history of events that occurred in the Transaction History and in the Child Continuity Data relating to the disposition of Parent application Ser. No. 15/497,581 with no continuity linking of Ser. No. 16/102,248. Application 102,248 was filed on Aug. 13, 2018, within the timeline to avoid Abandonment of Parent application Ser. No. 15/497,581:

TABLE A

EVENTS RELATED TO DISPOSITION OF 15/491,581

| Date | Event |
|---|---|
| *Transaction History* | |
| Mar. 7, 2018 | Final Rejection Mailed |
| Apr. 26, 2018 | Correspondence Address Change |
| Apr. 27, 2018 | Change of Power of Attorney |
| Sep. 17, 2018 | Aband. For Failure to Respond to O.A. |
| Sep. 19, 2018 | Mailed Abandonment for Failure to Respond to Office Action |
| *Continuity Data* | |
| May 2, 2017 | PCT/US17/30551 which is Published claims benefit of 15/497,581 |
| Jun. 6, 2018 | 16/001,254 which is Pending claims benefit of 15/497,581 |

Note from the Child Continuity the reference to application Ser. No. 16/001,254. I was notified by my then attorney of an apparent mistake in filing made by the Petition Office, and this required my then attorney to submit a new Continuation application, which is Ser. No. 16/102,248. The Continuation application Ser. No. 16/102,248 was submitted on Aug. 13, 2018 but was never properly linked to parent application Ser. No. 15/497,581 for which it is a continuation. Although there is reference to this continuity in Paragraph [001] of application Ser. No. 16/102,248 under the heading of "Cross-Reference to Related Application", the USPTO system does not show the proper continuity link.

BACKGROUND OF THE INVENTION

Field of the Invention

Traditional analytics systems, such as those created by vendors and product payment vendors like MASTERCARD and VISA, are used by companies like SAS INSTITUTE and GOOGLE to run analytics that determine, through scenario planning predictions, future consumer buying behavior. These systems are limited to particular types of purchases and rewards. The invention relates to marketing analytics and in particular to systems and methods therefor for capturing consumer purchase histories and preferences and updating transactions based on the same.

Related Art

Traditional analytics systems, such as those created by vendors and product payment vendors like MASTERCARD and VISA, are used by companies like SAS INSTITUTE and GOOGLE to run analytics that determine, through scenario planning predictions, future consumer buying behavior. These systems are limited to particular types of purchases and rewards. From the discussion that follows, it will become apparent that the present invention addresses the deficiencies associated with the prior art while providing numerous additional advantages and benefits not contemplated or possible with prior art constructions.

SUMMARY OF THE INVENTION

A preference-based data collection and discounting system (hereinafter "Spice Chip System") and methods therefor are disclosed herein. In general, the Spice Chip System includes systems and methods used to track the buying habits of a consumer and reward consumers through discounts. The buying habits may be interrogated by a database of one or more algorithms, which will result in a collated database about consumer buying habits. This collated data may be used by vendors to make marketing assumptions that will influence a consumer's future purchase decisions. Consumers may directly update their preferences if desired. The process involves data retrieval and manipulation to build Big Data for retail vendors that does not solely rely on historical transactions. It provides a user interface that accepts input/modifications from customers that feed into the manipulation of algorithms. The acquired data is then built into a meta database that uses additional algorithms to transform it into meaningful analysis for decision making. The Spice Chip System improves technology through its process for acquiring valid retail data source for identifying consumer brand preference as well as transforming and exploring data, a technique known as data munging where both areas together are improvements that benefit technology users and retail vendors.

Various embodiments of a Spice Chip System are disclosed herein. For instance, in one exemplary embodiment a preference-based data collection and discounting system is disclosed, comprising one or more terminals that receive a list of product preferences from one or more consumers one or more unique identifiers fixed on one or more non-transitory storage mediums, one or more POS systems comprising a reader that detects the unique identifiers on the non-transitory storage mediums, and one or more servers. The unique identifiers are assigned to the consumers.

The servers receive discount criteria from one or more vendors, receive and store the list of product preferences from the terminals and receive transaction information comprising pricing information from the POS systems. In addition, the servers update the list of product preferences based on the transaction information only when the reader detects at least one of the unique identifiers and apply the discount criteria to the product pricing only when the reader detects at least one of the unique identifiers.

It is noted that the non-transitory storage mediums may be microchips, such as those in credit cards, smartphones, wearables and other devices. In addition, the servers may store the transaction information. The servers may store and also collate the transaction information in some embodiments. The transaction information may include at least one of the unique identifiers when the reader detects at least one of the unique identifiers.

The system may also include a web server that generates a user interface for receiving the list of product preferences and transmits the user interface to the terminal. In addition, the servers may include at least one database server.

In another exemplary embodiment, a non-transitory computer-readable medium is disclosed. The non-transitory computer-readable medium comprises instructions which, when executed by one or more computers, cause the computers to generate one or more unique identifiers for each of the consumers, receive a list of product preferences from one or more consumers, receive discount criteria from one or more vendors and receive transaction information comprising product pricing information from one or more POS systems.

The POS systems comprise one or more readers that detect the unique identifiers via the non-transitory storage mediums. The unique identifiers are fixed on one or more non-transitory storage mediums. Similar to above, the non-transitory storage mediums may be microchips.

The non-transitory computer-readable medium also cause the computers to update the list of product preferences based on the transaction information only when the readers detect the unique identifiers and apply the discount criteria to the product pricing only when the readers detect the unique identifiers.

The computers may store the transaction information. It is noted that the transaction information may include at least one of the unique identifiers. The computers may store and also collate the transaction information as well. Also, the computers may generate a user interface for receiving the list of product preferences from the consumers.

In yet another exemplary embodiment, a computer-implemented method for preference-based data collection and discounting is disclosed, comprising receiving a list of product preferences from one or more consumers via one or more communication devices, storing discount criteria product pricing information on one or more storage devices and receiving transaction information from one or more POS systems. The POS systems comprise one or more readers that detect one or more unique identifiers stored on one or more non-transitory storage mediums. The unique identifiers identify the consumers.

The computer-implemented method also includes, when the readers detect at least one of the unique identifiers, receiving the at least one of the unique identifiers, and updating the list of product preferences based on the transaction information.

The non-transitory storage mediums may be microchips, such as described above. The transaction information may be stored on the storage devices. The transaction information may include the at least one of the unique identifiers when the readers detect the at least one of the unique identifiers. A user interface for receiving the list of product preferences from the consumers may be generated as well. It is noted that the discount criteria may be applied to the product pricing when the readers detect the at least one of the unique identifiers as well.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION OF THE INVENTION

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

GLOSSARY OF TERMS, ABBREVIATIONS AND ACRONYMS

"ADI" stands for "Automatic Data Input" and means a technology where data is entered without human intervention.

"Algorithm" means a set of rules to solve a problem written to instruct a computer; a program.

"Analytics" means systematic analysis of data or statistics.

"ASIN" stands for Amazon Stock Identification Number.

"BPaas" stands for Business Process as a Service.

"Client" means the group of investors in Spice Chip that constitute the angel round of funding.

"Cloud Computing Technology" means cloud is a metaphor for the Internet. The technology involves sharing information by way of satellite networks.

"Contactless Smart Card" means credit card size embedded with circuits allowing communication with terminals via radio waves. Can store and process data.

"Developer" means the person(s) developing the capabilities outlined in the SRS.

"DW" stands for Data Warehouse.

"EAN" stands for European Article Number.

"ETL" stands for Extract, Transform, Load and means the process to extract data from homogenous or heterogeneous data sources, transforming in proper structure, loading into database for query and analysis.

"GTIN" stands for Global Trade Item Number.

"GUID" stands for Globally Unique Identifier.

"Iaas" stands for Infrastructure as a Service.

"I/O" stands for Input/Output and means directional flow of data to/from a system.

"IoT" stands for Internet of Things and means the collection of physical objects, devices, buildings, appliances and other items embedded with electronics, software, network connectivity enabling these objects to exchange data.

"ISP" stands for Internet Service Provider and means the various technologies offering access to the Internet.

"JAN" stands for Japan Article Number.

"NoSQL" stands for Non-Structured Query Language and means an approach for accessing non-relational databases.

"OLAP" stands for On-Line Analytic Processing.

"OLTP" stands for On-Line Transaction Processing.

"OS" stands for Operating System and means system software that manages the hardware and software.

"Product Consumers" means consumers that purchase products from participating vendors.

"Product Vendors" means vendors that participate in Spice Chip by providing their UPCs for tracking as well as various forms of discounts for Product Consumers.

"POS" stands for Point of Sale and means a system used in retailer to track sales and inventory of products.

"RAC" stands for Real Application Cluster and means a type of installation of multiple database instances and servers one a single physical server.

"RealData" means Spice Chip's technology for source data including technology for acquiring data directly from the source, namely the consumer, at the time of purchase.

"RF" stands for Radio Frequency and means electrical oscillations of wave frequencies, such as in the range of 3 kHz to 300 GHz. A frequency within range where radio waves are transmitted.

"RFID" stands for Radio Frequency identification and means a wireless system of tags and readers to automatically identify and track tags attached to objects.

"RTM" stands for Requirements Traceability Matrix and means a document that captures all requirements and traces progress over the lifecycle of the development project.

"SAN" stands for Storage Area Network.

"SDK" stands for Software Development Kit and means an application programming interface to allow two systems to interact and exchange data.

"SDLC" stands for Software Development Life Cycle and means a project management concept describing stages of a system's development.

"SQL" stands for Structured Query Language and means programming language for accessing relational databases.

"SRS" stands for System Requirements Specifications.

"UPC" stands for Universal Product Code.

In general, a Spice Chip System collects and provides consumer data which comes directly from the source, namely consumers, for tracking consumer buying behavior and habits via a RealData component. The RealData component does not require a specific form of payment such as a specific credit card. Instead, a RealData database includes a wider variety of consumer buying experiences or histories regardless of method of payment/acquisition. The consumer simply uses their unique identifier to identify themselves anytime a product is acquired. In addition, consumers have the ability to modify their profile preferences for product offerings. Vendors may be provided with information that is based on consumer perceptions in real time or near real time.

Traditional analytics systems, such as those created by vendors and product payment vendors like MASTERCARD and VISA, are used by companies like SAS INSTITUTE and GOOGLE to run analytics that determine, through scenario planning predictions, future consumer buying behavior. In contrast, the Real Data approach gives a richer gauge of predicting consumer behavior because its data is not limited to credit card type purchases. For example, if a consumer acquires a JOHN DEERE tractor through an arrangement with another consumer, the acquiring consumer can use a Spice Chip System to record the transaction through manual entry to their profile by adding JOHN DEERE to their personal list of product preferences (hereinafter "Spice Rack"). This approach will give consumers first-hand control over their buying behavior profiles.

Figure 1:
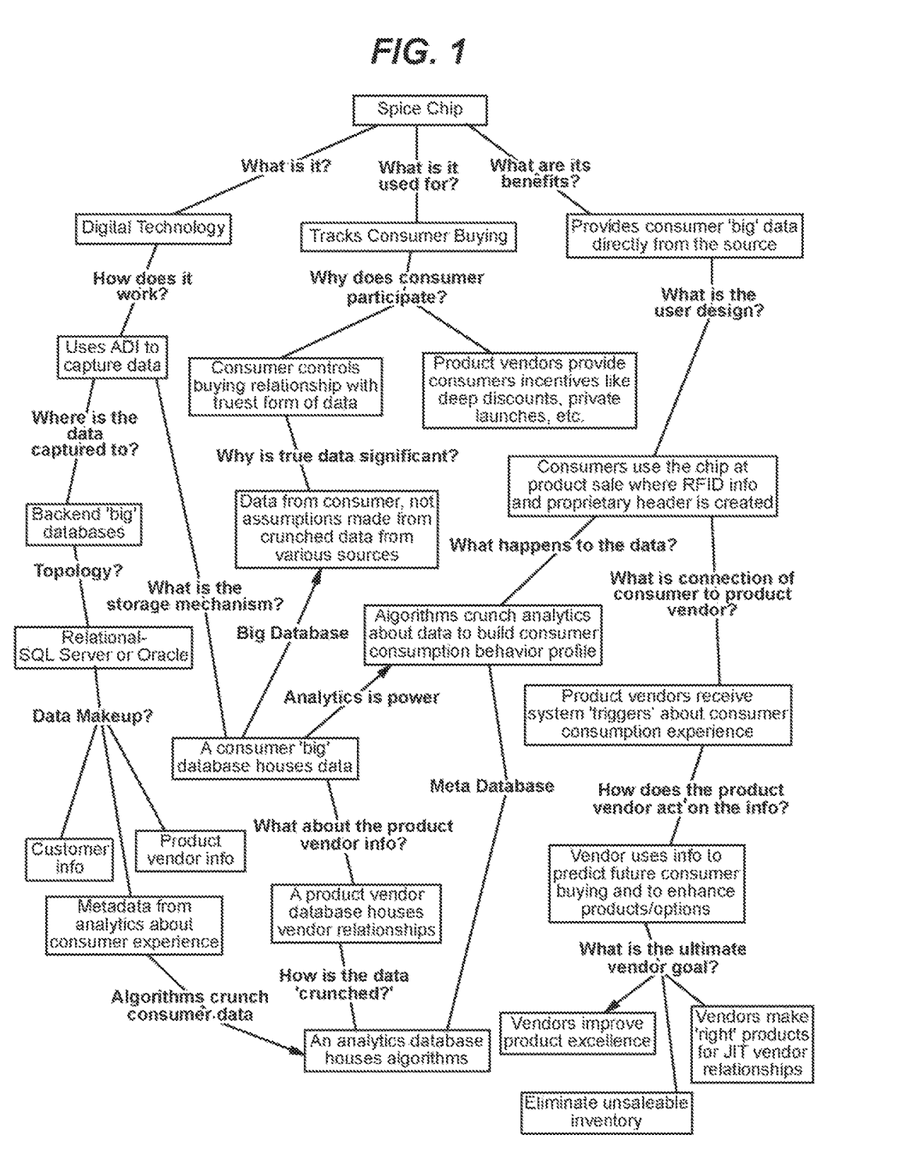
FIG. 1 is a block diagram illustrating a mapping of an exemplary Spice Chip System environment.

Buying habits collected by a Spice Chip System may be interrogated by one or more algorithms, which will result in a collated database about consumer buying habits. This collated database may be used by vendors to make marketing assumptions that will influence a consumer's future purchase decisions. An exemplary Spice Chip System environment is illustrated in FIG. 1.

Users of a Spice Chip System may be consumers, vendors or others. In general, a consumer would subscribe to the Spice Chip System as a service thereby allowing the service to capture their consumption habits. In general, a vendor (e.g., merchant, manufacturer, retailer, service provider) would subscribe to the Spice Chip System service in order to access the collated database about consumers through the use of analytic statements or queries. A vendor may provide discounts and related forms of incentive to motivate consumers for continued, repeat business. A vendor may also be part of a global partner alliance for vendor point of sale (POS) acceptance of a Spice Chip System card.

In one or more embodiments, a Spice Chip System comprises a collaboration of relational databases that consists of Big Data back ends connected to web enabled front ends. A Big Data back end may employ multiple parallel relational or other databases housed on one or more respective database servers. Some exemplary database servers include the following:

Java database server

SQL database servers of "Big Data" about consumer information

SQL database server for meta information about consumers

Database server for information about vendors

Database server for information about retailer POS

Database server for automatic data input (ADI) technology

Database servers (respective) for ETL link with 1) retailer POS systems and 2) data warehouse NoSQL servers for data science and analytics In addition to a relational and non-relational database environment that will include capability for Big Data analytics, various hardware will be incorporated for use as data entry points using ADI technology, such as in the following ways:

1. The Spice Chip System will include a digital signature or other identifier to uniquely identify consumers. For instance, a digital chip embedded into a credit card (such as a contactless smart card) a smartphone or wearable, may store the unique identifier, which may be communicated via radio frequencies. A unique identifier may also or alternatively be stored in a barcode or other non-transitory storage medium, aside from electromagnetic signals or carrier waves, applied to credit cards, wearables, or other articles carried by consumers. The unique identifier may be read by an associated reader, such as a card reader, in the case of a digital chip, or a barcode reader, in the case of a barcode.

2. Output hardware for data will typically comprise I/O components such as card readers, retailer POS interfaces, vendor systems interfaces and reporting systems. Some examples of reporting systems include TABLEAU for dashboard creation, SAS for canned and custom report requests.

In addition to ADI enabled data input, user-enabled or manual input may occur through a user interface, such as a web or other interface, that allows consumers to provide profile information describing their preferences.

Hardware components of a Spice Chip System may be interconnected in various ways. For example, the hardware components may be interconnected via one or more wired or wireless networks, such as one or more LANs, WANs, the Internet, or various subsets thereof. A Spice Chip System may utilize cloud services. For example, a database server infrastructure may utilize different cloud offerings of IaaS, PaaS, SaaS or BPaaS.

Connections and relationships between a Spice Chip System and external devices will now be described with regard to FIG. 2. As can be seen, a consumer may initiate a relationship by requesting a unique identifier for consumer use during sales transactions. When transaction information, such as a purchase transaction, is received by the Spice Chip System, established vendor criteria are applied to determine an appropriate discount. The Spice Chip System then passes the discount provided by the vendor to the consumer by updating the sales transaction to reflect the discount.

As will be described further below, the core functionality of a Spice Chip System will typically be driven by the relationship with vendors and retailers. In general, vendors supply UPCs and discount criteria and permit the Spice Chip System to return the appropriate manufacturer discount at a POS.

Vendors allow interrogation of sales transactions by the Spice Chip System in order to capture UPC information and update transactions to provide relevant discounts. Of course, this relationship also includes consumer participation.

Figure 3:
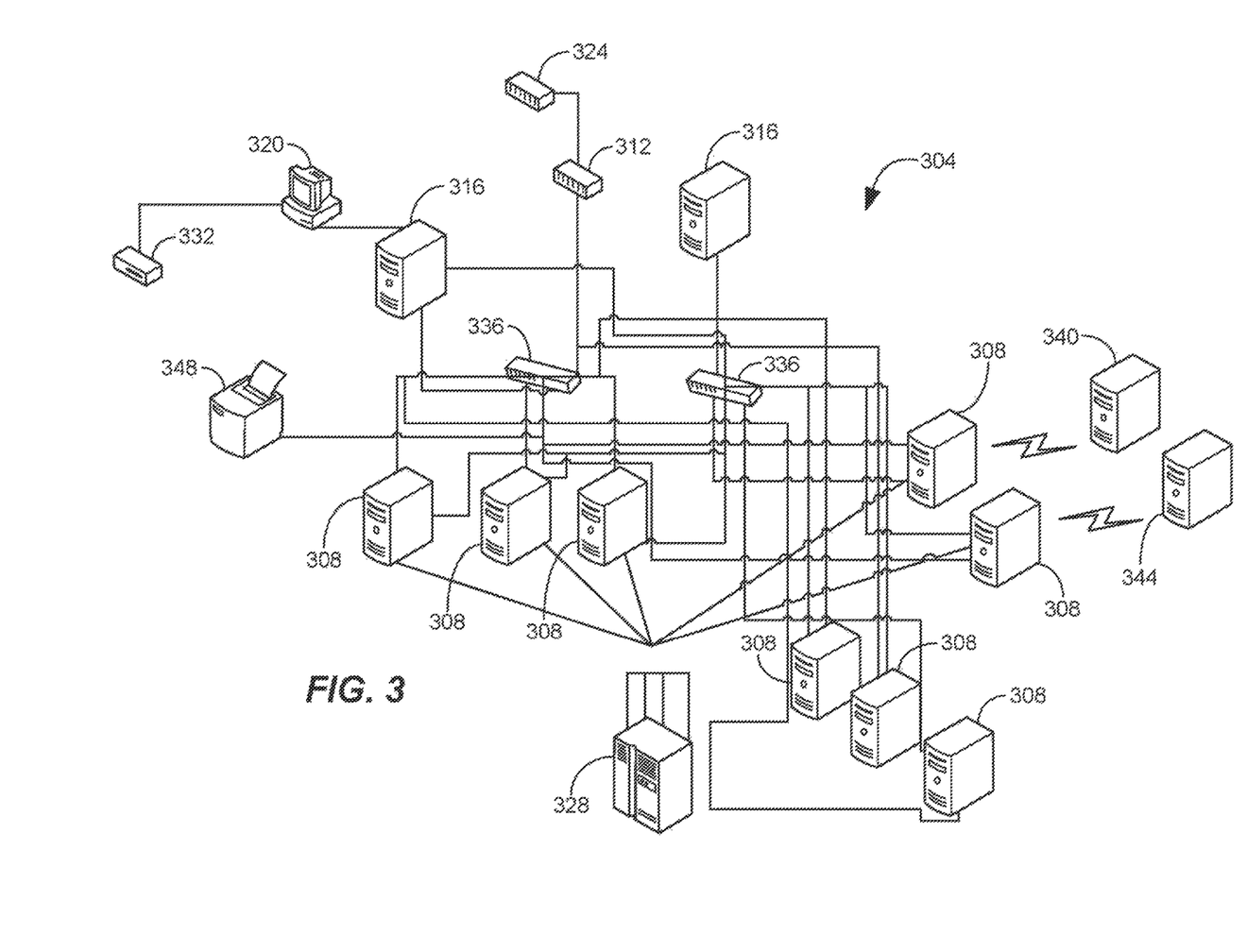
FIG. 3 is a block diagram illustrating an exemplary Spice Chip System.

FIG. 3 illustrates an embodiment of a Spice Chip System 304 in an exemplary environment of use. In one or more embodiments, a Spice Chip System 304 may comprise one or more servers 308, 312, 316 interconnected with one or more terminals 320, via one or more communication links, networks or both. As stated above, communication may occur through various networks, including WANs, LANs and the Internet. The elements of a Spice Chip System 304 may communicate via wired communication links, wireless communication links or both. One or more switches 336 or other network equipment may be used to facilitate communication.

Various servers 308, 312, 316 may be part of a Spice Chip System 304. For example, a Spice Chip System 304 may include one or more database servers 308 that store one or more types of information. The database servers 308 may have relational or non-relational databases. As shown in FIG. 3, one or more database servers 308 may store consumer information, vendor information, metadata for the same or various subsets thereof.

Product information, POS information, and transaction information may also be stored on a database server 308. It is noted that such information may be received from a third-party system. To illustrate, product information may be received or retrieved from a third party UPC server 340 or the like. For example, one or more product UPCs of a vendor may be received from a vendor's UPC server 340 by a database server 308. Likewise, purchase or other transaction information, POS information or both may be received or retrieved from a third-party POS system 344 or the like by a database server 308. Results from one or more analytic statements or queries may be stored in some embodiments. It is contemplated that such mining data may be stored in a database server 308 as well.

Information used by a Spice Chip System may comprise data formatted in specific ways. For example, there may be a distinction between data files, such as database files containing binary data, image data, and database information and text files, which contain ASCII (American Standard Code for Information Interchange) data. Other files within a database may include index files, data dictionaries, and files that store administrative information.

Table 1 provides exemplary definitions for data, such as that described above, that may be used by a Spice Chip System 304, such as via one or more database servers 308.

TABLE 1

DATA DEFINITIONS

| Data Entity | Elements | Definition |
|---|---|---|
| Brand Information | Brand ID<br>Brand Name<br>Brand Product<br>Brand Category<br>Brand Vendor | Data about a report |
| Category Information | Category ID<br>Category Description | Data about product categories. |
| Consumer Information | Unique Identifier<br>Spice Chip ID<br>First Name<br>Last Name<br>Screen Name<br>Email Address<br>Password<br>Validation Code<br>Activation Status<br>Phone<br>Membership Date<br>Billing Address<br>Billing City<br>Billing State<br>Billing Country<br>Billing Postal Code | Data about a consumer. |

TABLE 1-continued

DATA DEFINITIONS

| Data Entity | Elements | Definition |
|---|---|---|
| Consumer Spice Rack | Link to Product UPC<br>Product Names that are lookups from a products database<br>Ranking | Preferred products with consumer rankings of such products. |
| Contact Us Information | Contact Number<br>Contact First Name<br>Contact Last Name<br>Contact Email<br>Contact Phone<br>Contact Address<br>Contact City<br>Contact State<br>Contact Postal Code<br>Contact Country<br>Is Contact a Vendor?<br>Message | Data for a "Contact Us" message. |
| Country Information | Country Information<br>Country Code<br>Country Code Name | Data about a country. |
| Membership Information | Unique Identifier<br>Customer ID<br>Customer First Name<br>Customer Las Name<br>Customer Email<br>Membership Date | Data about a membership. |
| Metadata | Unique Key<br>Consumer Spice Chip Unique Identifier<br>Consumer Unique Identifier<br>UPC<br>Product Vendor Multiplier Field<br>LONG Field | Data and analytics relating to a consumer's Spice Rack. |
| Payment Information | Payment Type ID<br>Customer ID<br>Vendor ID<br>Customer Membership Date<br>Vendor Membership Date<br>Payment Type<br>Checking Account Bank Name<br>Check Routing Number<br>Check No.<br>Check Account Holder<br>Credit Card<br>Credit Card Number<br>Credit Card SSID | Data about a payment. |
| Product Information | Vendor Product GTIN (UPC, EAN, JAN or ISBN)<br>Vendor ID<br>Product Category<br>Product Discount<br>Brand Name<br>Product Description<br>Product Image<br>Product Keywords | Data about a product. |
| POS Information | Unique Key<br>Retailer Name<br>Register Number<br>Address<br>Contact Name<br>Contact Title<br>Contact Phone<br>Contact Email | Data about a POS |
| Product Rank Information | Product Rank ID<br>Customer ID<br>Vendor ID<br>Vendor Product ID<br>Product Spice Rack Rank<br>Retailer ID<br>Purchase Transaction ID | Data about a product rank. |
| Report Information | Report ID<br>Report Description<br>Report Image | Data about a report. |

TABLE 1-continued

DATA DEFINITIONS

| Data Entity | Elements | Definition |
| --- | --- | --- |
| Retailer Information | Retailer ID<br>Company Name<br>Company Address<br>Company City<br>Company State<br>Company Country<br>Company Postal Code<br>Contact First Name<br>Contact Last Name<br>Contact Phone<br>Contact Email<br>Company Website URL<br>Retailer Membership Date<br>Retailer POS ID<br>Retailer POS Location ID<br>POS Location Description<br>State Code<br>Country Code | Data about a retailer. |
| Spice Chip Reader ID | Unique Identifier<br>Customer Name<br>Issue Date | Unique Identifier for consumer provided by reader system to create a physical card. |
| State Information | State ID<br>Postal State Code<br>State Code Name | Data about a state. |
| Transaction Information | Purchase Transaction ID<br>Retailer POS ID<br>Unique Identifier<br>Retailer ID<br>Retailer POS Location ID<br>Vendor ID<br>Vendor Product ID<br>Discount Calculation | Transaction representing a consumer buying experience or purchase. |
| Vendor Information | Vendor ID<br>Company Name<br>Company Address<br>Company City<br>Company State<br>Company Country<br>Company Postal Code<br>Contact First Name<br>Contact Last Name<br>Contact Phone<br>Contact Email<br>Vendor Password<br>Vendor Validation<br>Vendor Activation<br>Vendor Membership Date<br>Vendor Membership Type<br>Vendor Payment Type | Data about a vendor. |

One or more storage devices for storing information will typically be part of a Spice Chip System as well. A storage device may store information magnetically, optically, on solid state media or by other data storage technologies now known or later developed. For example, a storage device may be a flash, optical or magnetic drive. As can be seen, storage devices may be provided in a storage array 328 accessible to one or more servers 308, 312, 316. Alternatively, or in addition, storage devices may be integrated into one or more servers 308, 312, 316.

A Spice Chip System 304 may also include one or more admin servers 316. Typically, an admin server 316 will be used to manage, administrate or setup a Spice Chip System 304. This includes creating and maintaining user accounts (e.g., vendor and consumer accounts), managing user access and managing and maintaining the Spice Chip System 304. Admin servers 316 will typically be in communication with one or more database servers 308 to modify associated records stored thereon.

A Spice Chip System 304 may also include interface servers, such as web servers 312, that provide user interfaces to users. In general, a web server 312 or other interface server will access information stored in one or more database servers 308, format the information, and provide the formatted information to a user in a user interface. It is noted that a web server 312 or other interface server may also provide information without a user interface. For example, a data stream may be provided that can be placed in a user interface generated by another device. A load distribution server 324 may be provided to distribute loads across one or more web servers 312 or other interface servers.

One or more terminals 320 may be used by users to access a Spice Chip System 304. A terminal 320 may be a kiosk, computer, smartphone, tablet or other computing device. Consumers, vendors and other users may access and interact with a Spice Chip System 304 via a terminal 320. For example, consumers may subscribe to a Spice Chip System 304, input their preferences and update their accounts via a terminal 320, while vendors may subscribe to a Spice Chip System 304 and update their accounts via a terminal. One or more output devices, such as printers 348 may be attached to a terminal 320. A terminal 320 may be used to display a user interface for users, such as via a screen or other display device.

A reader device 332, such as a card reader or barcode reader, may be provided to read Spice Chip System's unique identifiers. Such unique identifiers may be stored on a credit card, wearable or other article. In operation, the reader device 332 may be used to identify a consumer at a terminal 320. A reader device 332 may read a unique identifier with or without physical contact with a credit card, wearable or other article. It is noted that a reader device 332 may be at a POS system 344 to identify consumers as well. It is contemplated that, in some embodiments, a reader device 332 may comprise a keypad or other input device to allow a unique identifier to be inputted manually.

It is contemplated that a single or reduced number of servers may be used to provide the services of multiple distinct servers. For example, the same server may be a database server 308 and an interface server 312, among other things. In other words, it is possible for a Spice Chip System 304 to be implemented by a single server or by multiple servers.

Operation of a Spice Chip System 304 will now be described with regard to the flow diagram of FIG. 4. In general, when a consumer makes a purchase, the corresponding purchase transaction contains information about the vendor and product UPCs. When the consumer presents their unique identifier to a vendor, the purchase transaction information is passed to the Spice Chip System and the information is associated with the consumer. The Spice Chip System may perform analytics that by a vendor. The analytics issue a discount which is passed to the vendor POS to update the purchase transaction.

Figure 4:
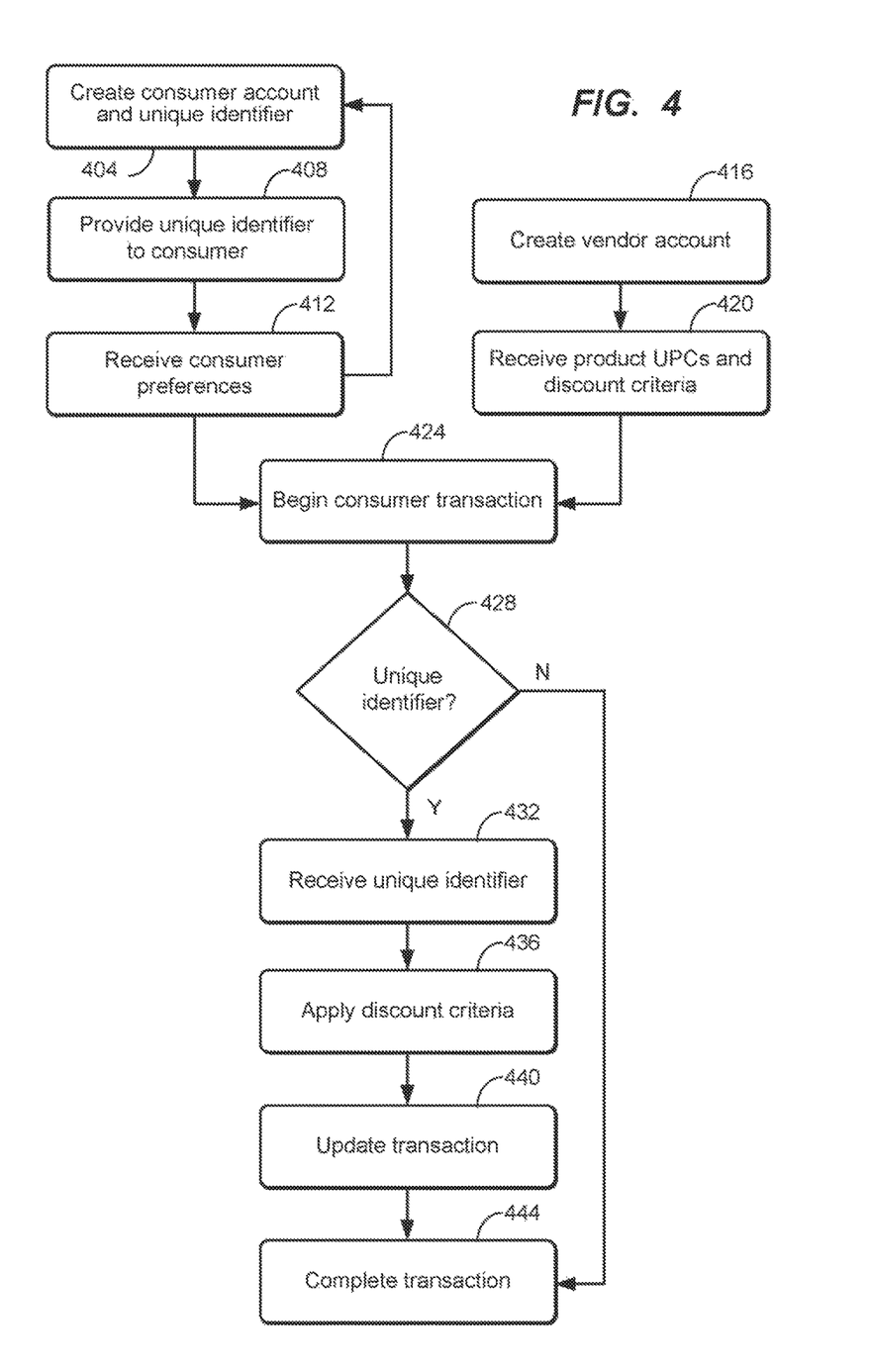
FIG. 4 is a flow diagram illustrating operation of an exemplary Spice Chip System.

Referring to FIG. 4, at a step 404 a consumer account may be created, such as when a consumer signs up or subscribes to the Spice Chip System. Consumer information may be received at this time. In addition, a unique identifier, which uniquely identifies the consumer, is generated. This unique identifier may be provided to the consumer at a step 408. This may occur in various ways. For example, a consumer may be presented with their unique identifier on a terminal, given a credit or other card digitally or otherwise physically storing or bearing the identifier, given a wearable or other article storing or bearing the identifier.

At a step 412, consumer preferences, including product rank information, may be received. For example, product or service preferences, such as product type, brand or other product characteristic preferences may be received from the consumer. As illustrated by the arrow from step 412 to step 404, consumer preferences may be repeatedly updated as desired by a consumer. The Spice Chip System captures up to date information on consumer preferences in this manner, permitting the Spice Chip System to provide more desirable discounts (i.e., discounts more likely to be relevant) to a consumer. In addition, uninteresting discounts can then be avoided.

The discount is adjusted or modified based on various aspects of both the consumer's personal Spice Rack, the product, and the vendor. In some embodiments, the discounts are applied to each product within the consumer's personal Spice Rack. The discounts may be adjusted for each product on the consumer's personal Spice Rack through a linear or quadratic equation, wherein an product in a lower position (e.g. 1, 2, 3, etc.) on the consumer's personal Spice Rack has a greater discount than a product in a higher position (e.g. 9, 10, 11, etc.).

In some embodiments, the discount is adjusted based on categorical preferences. Such as, specific vendors, product types, or other variables associated with the products and/or vendors. In some embodiments, the discount is adjusted based on multipliers which are applied to predetermined and calculated products or positions on the consumer's personal Spice Rack. In some embodiments, the discount can be squared, or have more than one multiplier applied.

Through Logistic Regression, the discount can be to be adjusted from a quadratic or non-linear function, that is applied to determine the best offer for a product that is in a predetermined position on the consumer's personal Spice Rack, or to a group of positions. The algorithms include as predictors quantifiable historical data about a consumer's selection or products on their personal Spice Rack. Collected data from the various consumers is compiled to further modify the discount to incentive the consumer to purchase specific products or purchase products from a specific vendor.

It is noted that a consumer's personal Spice Rack and updates thereto may be received at step 412 as well. For example, products may be added or removed from a Spice Rack by a consumer at step 412. This may also automatically update consumer preferences based on one or more characteristics of the products added or removed. The consumer information received at steps 404 through 412 may be received by the Spice Chip System and stored in one or more database servers.

An independent process may take place with regard to vendors. As shown in FIG. 4 for example, vendor account creation, receipt of product information, including UPCs and discount information, including locations and IDs for a vendor's POS systems, may also be received by the Spice Chip System at step 416 during account creation. It is noted that the various vendor information may be updated as well.

At a step 424, a consumer transaction begins. Typically, this will be a purchase transaction. Transaction data may be accessed by a Spice Chip System through an established ETL pipe from a POS system, such as in the following exemplary sequence of events for each product type identified in a transaction:

1) When a unique identifier, such as a bar code or digital chip, is scanned at POS system's reader device, this triggers the POS system to contact the Spice Chip System;
2) Read the transaction information, including UPCs, from the POS system and write to a consumer database initiating creation of record;
3) Read the unique identifier and link the same to the consumer database record;
4) Access the consumer's Spice Rack and read all UPCs of the same vendor then write these fields to a customer metadata record LONG field, create a stored field for calculating a discount that is created for each occurrence of the vendor in the consumer's Spice Rack (using a multiplier of 1 as default);
5) If new, add the UPC to the consumer's Spice Rack;
6) Retrieve the vendor discount from a product database;
7) If the consumer has other UPCs from the vendor in their Spice Rack, update the stored multiplier to reflect the same; and
8) Perform calculation, such as in a temporary field, where an amount is retrieved from the transaction information (from the POS system) and multiplied by the result of stored multiplier field from the consumer metadata database. Then the transaction amount is updated to reflect discount.

As shown in FIG. 4, at a decision step 428, if a unique identifier is present (i.e., the consumer subscribes to the Spice Chip System), the same may be received by the Spice Chip System at a step 432. If a unique identifier is not present at decision step 428, the transaction may proceed to completion at a step 444. Typically, this means the purchase is completed by the POS system receiving payment from the consumer.

Referring back to step 432, after a unique identifier is received at step 432, discount criteria may be received for the particular consumer identified by the unique identifier, such to take into account the consumer's Spice Rack for discounting purposes, such as described above. At a step 436, the discount criteria may be applied resulting in a discount amount. The discount criteria will typically be provided from a vendor, such as at step 420 described above. For example, discount criteria may be included in product information provided by a vendor. Discount criteria may define an absolute or percentage discount. It is noted that discounts may be provided at other times as well, as will be described with regard to FIG. 9 below.

At a step 440, the transaction may be updated based on the discount criteria to generate a discounted amount for one or more products in the transaction. Thereafter, the transaction may be completed at a step 444, such as by the consumer paying a discounted amount for one or more products in the transaction. Transaction information describing and used during the transaction may be stored thereafter.

A wide variety of transactions may be handled by a Spice Chip System. This is because a unique identifier can be presented during a wide variety of purchases, including online, brick and mortar, telephone, credit card, and automatic payment purchases. In some cases, a unique identifier may be presented or read electronically, such as via a card or barcode reader. Alternatively, a unique identifier may be manually presented such as audibly to a vendor via a telephone purchase transaction.

As disclosed above, a Spice Chip System also updates consumer information when a transaction is made with a unique identifier. This update consumer preferences based on the products being purchased, such as to provide discounts for similar, related or complementary products. To avoid to selectively opt-in or opt-out. For example, if a consumer is purchasing a gift for someone else the consumer may choose to forego providing their unique identifier, and thereby avoid altering their metadata and preferences. It is contemplated that a consumer may communicate an opt-out signal or flag along with their unique identifier in some embodiments. This is to permit a consumer to receive any applicable discount without altering their preferences.

Figure 5:
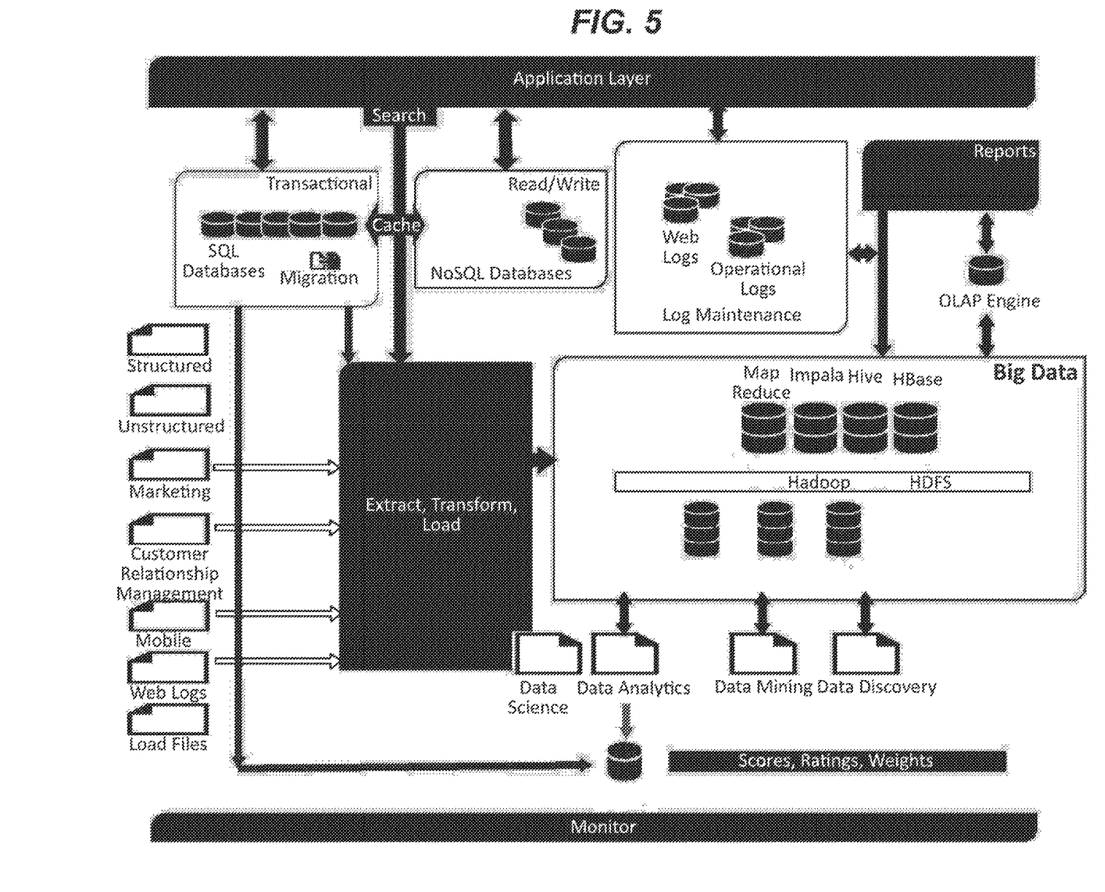
FIG. 5 is a block diagram illustrating an exemplary software architecture.

FIG. 5 illustrates an exemplary software architecture for a Spice Chip System. As can be seen, the overall software architecture may include one or more databases, logs, data analytics, data mining, data discovery modules. In addition, one or more data migration modules for extracting, transforming and loading information from one database (or data source) to another may also be included. The various modules of the Spice Chip System's software will be fixed on a non-transitory storage medium and executed by one or more processors, such as those of one or more servers. The non-transitory storage medium herein does not include carrier waves and electronic signals transmitted via wired or wireless communication links.

Figure 6:
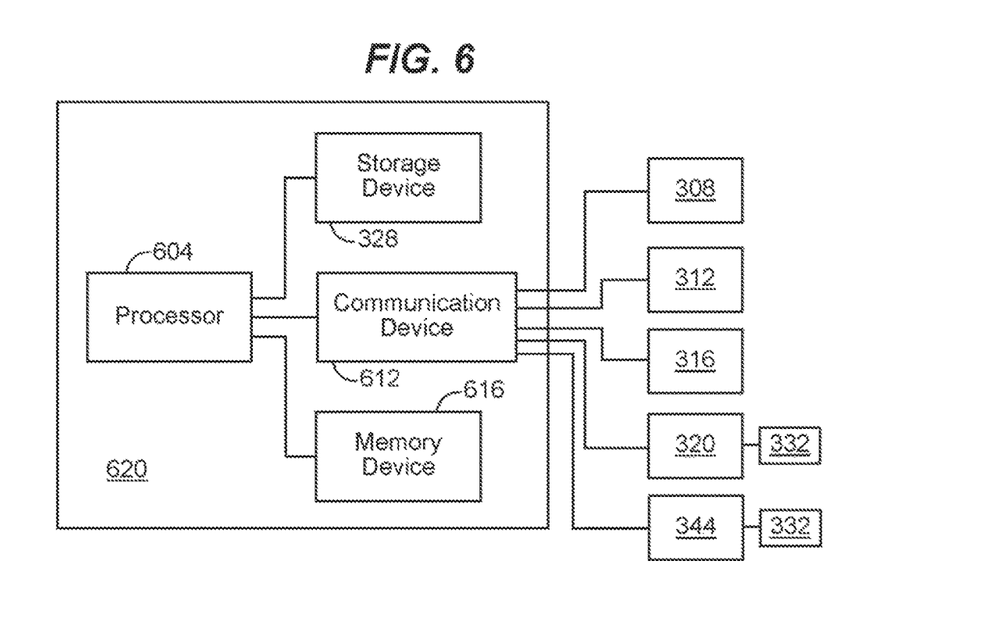
FIG. 6 is a block diagram illustrating an exemplary Spice Chip System server.

FIG. 6 illustrates an exemplary server 620 of a Spice Chip System. A server 620 may be a computer in one or more embodiments. As can be seen, a server 620 may comprise one or more processors 604, memory devices 616 and communication devices 612. In addition, a server 308 may include an internal storage device 328 or be connected to an external storage device or array, such as shown in FIG. 3.

In one or more embodiments, a processor 604 may execute machine readable code fixed on a non-transitory storage medium to provide the functionality disclosed herein. The machine-readable code will comprise instructions in one or more embodiments, and may utilize one or more memory devices 616, storage devices 328, communication devices 612 or various subsets thereof during operation.

A storage device 328 may be a flash, optical or magnetic drive in one or more embodiments. A memory device 616 may be RAM in one or more embodiments. A communication device 612 may be a network interface or other communication device capable of communicating data via one or more wired or wireless communication links.

As can be seen, a communication device 612 may be used to communicate with one or more database servers 308, web servers 312, admin servers 316, terminals 320 or various subsets thereof. It is noted that a database server 308, web server 312, admin server 316 or other server may have a hardware configuration as shown in the exemplary server 620 of FIG. 6.

In operation, and with reference to FIGS. 4 and 6, a server 620 may create a consumer account and unique identifier at step 404 by storing consumer information on a storage device 328, such as via a database server 308. The consumer information may be received from a consumer via a terminal 320 in one or more embodiments. A processor 604, random number generator or both may be used to generate a unique identifier. It is contemplated a unique identifier may be a GUID for example.

At step 408, a communication device 612 may transmit the unique identifier to the consumer, such as to the user's terminal 320. Once a consumer account is created, and as desired thereafter, a consumer may input and update their Spice Rack, such as shown in step 412. At step 424 a consumer transaction may be initiated, such as at a POS system 344 of a vendor or a terminal 320.

At decision step 428, it is determined whether the consumer has a unique identifier. For example, a consumer may insert a card or other item bearing their unique identifier, input their unique identifier, or otherwise provide their unique identifier to a reader 332. If a unique identifier is detected, the same may be transmitted from the reader 332 to a server 620, which receives the same at step 432. It is noted that a POS system 344 or terminal 320 may first receive the unique identifier from a reader 332 and forward the same to the server's communication device 312.

Transaction information, describing the consumer transaction, may also be received at the server 620, via its communication device 312. The transaction information may be transmitted to the server 620 from the POS system 344 or terminal 320 and may be stored at a storage device 328 or database server 308. At a step 436, discount criteria may be applied to the transaction by the server 620. This may occur by retrieving the discount criteria for the consumer identified by the unique identifier from a storage device 328 or database server 308.

At step 440, the server 620 may update the transaction by transmitting the discounted pricing for the transaction to the POS system 344 or terminal 320 thereby updating the price to be paid by the consumer to complete the transaction. At step 444, the server 620 may receive a notification from the POS system 344 or terminal 320 indicating the transaction has completed. The server 620 may then store flag or the like with the transaction information to indicate the transaction has completed. Alternatively, it is contemplated that transaction information will not be stored unless and until the transaction has completed.

With regard to vendors, at step 416, a server 620 may receive vendor information from a POS system or terminal 320 and store the same at a storage device 328 or database server 308 to create a vendor account. Product information, which may include product UPCs and discount criteria, may be received from a vendor's POS system 344 or terminal 320 at step 420. This information may be received via a communication device 612 of the server.

Figure 7:
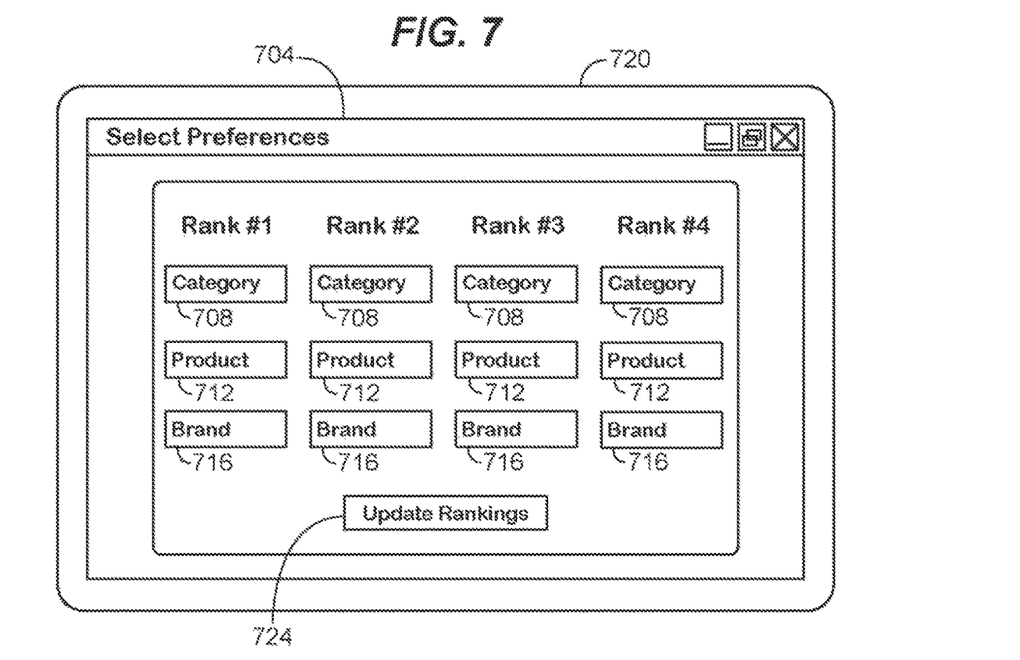
FIG. 7 illustrates an exemplary consumer preference collection screen.

FIG. 7 illustrates an exemplary preferences screen 704 that may be used by a consumer to input and update their Spice Rack. This screen 704 may be generated by a server, such as a web server, and transmitted to a terminal for presentation to a consumer in one or more embodiments. The preferences screen 704 may be presented via a display 720 of a terminal or other device. As can be seen, a consumer may provide a ranking of preferences for product categories, products themselves and brands.

A consumer may engage or select drop down lists 708, 712, 716, buttons or other user interface controls to reveal a list of selectable options for each type. In some embodiments, a consumer may request an option be added, if the desired selection is not in a provided list. For example, a consumer may make a request to add an option via an input form or via a chat or messaging element of the Spice Chip System.

As can be seen, a consumer may identify and rank their preferences for each type of information via a preferences screen 704. It is contemplated that additional preference types besides the category, product and brand types shown in FIG. 7 may be provided. Once entry or updating of their Spice Rack, the same may be stored by engaging a button 724 or other control to effectuate the same. As shown in FIG. 7, an "Update Rankings" button 724 is provided to initiate the same. Once stored or updated, the Spice Rack may be used during subsequent application of discount criteria for the consumer.

Figure 8:
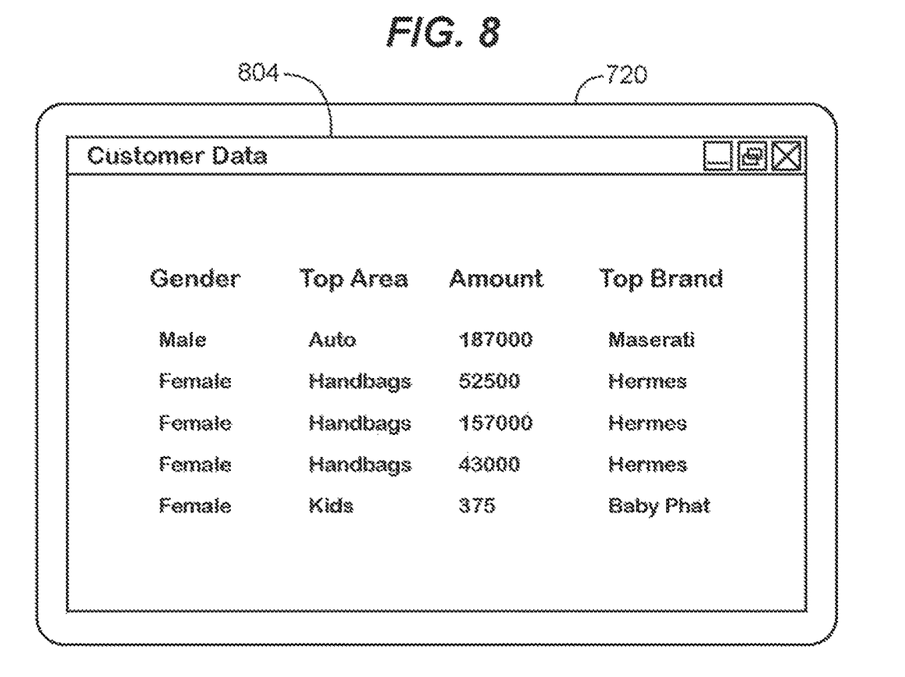
FIG. 8 illustrates an exemplary data presentation screen.

FIG. 8 illustrates exemplary transaction information that may be provided to vendors by a Spice Chip System. As can be seen, consumers' preferences, demographics and purchase information may be provided. It is noted that a vendor may run various predefined queries or their own queries or comparisons through a Spice Chip System to find the information they desire. Queries or comparisons may be executed via a terminal in communication with a Spice Chip System. A Spice Chip System may require a fee for some or all queries or comparisons.

Figure 9:
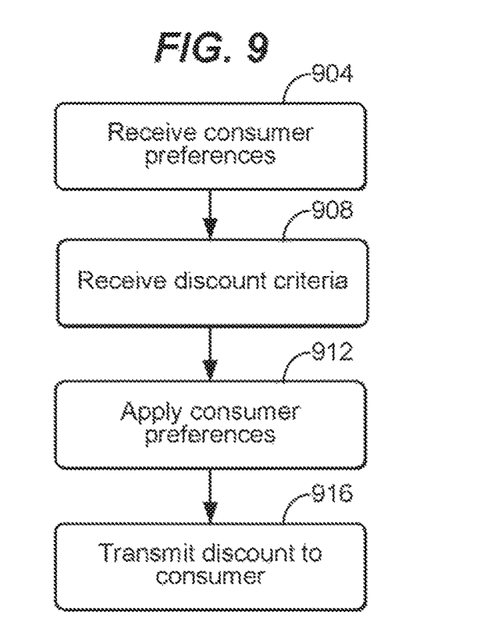
FIG. 9 is a flow diagram illustrating operation of an exemplary Spice Chip System.

Operation of an exemplary Spice Chip System while provisioning discounts will now be described with regard to the flow diagram FIG. 9. As can be seen, consumer preferences may be received from consumers at a step 904, while discount criteria may be received from vendors at a step 908. In one or more embodiments, consumer preferences and discount criteria may be received by a communication device of a Spice Chip System server, such as described above. The consumer preferences and discount criteria may be stored on a database server or other storage device.

At step 912 consumer preferences may be applied to determine which discount criteria are desired by a consumer. Once relevant discounts are identified, the same may be transmitted by a server to the consumer at a step 916. It is contemplated that transmission may occur in various ways. For instance, discounts may be emailed or otherwise transmitted to consumers at predefined times. Alternatively, or in addition, discounts may be presented when a consumer logs in to the Spice Chip System, such as via a terminal. Discounts may also be presented during transactions via a POS system.

The following describes exemplary Spice Chip System's process requirements, which relate the entities and attributes from the data requirements to the users' needs. The decomposition of the broader concept of the functionality is stated in terms of layers of increasing detail. Table 2 outlines exemplary functional process requirements.

TABLE 2

FUNCTIONAL PROCESS REQUIREMENTS

| No. | Requirement Description |
|---|---|
| 1 | Functional Process Requirements |
| 2 | Customer Acquisition Process |
| 3 | Spice Chip Smart Card Creation Process |
| 4 | Customer Profile Creation and Update Process |
| 5 | Web Interface for Customer and Vendor Access Creation Process |
| 6 | UPC Upload Process |
| 7 | Vendor Discount Criteria Creation Process |
| 8 | Retailer Configuration Process |
| 9 | Transaction Access and Update Process |
| 10 | Algorithm Process |
| 11 | Business Rules |
| 12 | Analytics Request Process |
| 13 | SQL Query Process |
| 14 | Standard and Custom Report Request Process |

Table 3 lists the steps of an exemplary consumer acquisition process.

TABLE 3

CUSTOMER ACQUISITION PROCESS REQUIREMENTS

| No. | Requirement Description |
|---|---|
| 1 | Customer Acquisition Process<br>The system provides consumer acquisition capability.<br>The system allows consumers to request a Spice Chip smart card. |
| 2 | Spice Chip Smart Card Creation Process<br>The system provides a method of providing a unique identifier to users.<br>The system provides a method for creating Spice Chip smart cards |
| 3 | Customer Profile Creation and Update Process<br>The system captures consumer data entry in profile fields.<br>The system allows consumers to update data in profile fields. |
| 4 | Web Interface for Customer and Vendor Access Creation Process<br>The system provides a web interface for consumer and vendor interaction.<br>The system provides consumers access to create and update their own profiles.<br>The system provides vendors web access to create and update their company profile.<br>The system provides vendors web access to run analytics on consumer metadata. |

Table 4 lists the steps of an exemplary vendor configuration process.

TABLE 4

VENDOR CONFIGURATION PROCESS REQUIREMENTS

| No. | Requirement Description |
|---|---|
| 1 | Vendor Acquisition Process<br>The system provides capability for entering vendor information. |

TABLE 4-continued

VENDOR CONFIGURATION PROCESS REQUIREMENTS

| No. | Requirement Description |
|---|---|
| 2 | Vendor UPC Upload Process<br>The system provides capability for importing vendor UPCs. |
| 3 | Vendor Discount Criteria Process<br>The system provides a process for creating discount criteria.<br>The system provides a process for maintaining vendor discounts. |

Table 5 lists the steps of an exemplary vendor configuration process for POS.

TABLE 5

VENDOR POS CONFIGURATION PROCESS REQUIREMENTS

| No. | Requirement Description |
|---|---|
| 1 | Vendor Configuration Process<br>The system provides capability for entering vendor information. |
| 2 | Transaction Access and Update Process<br>The system provides capability for accessing vendor POS transactions<br>The system provides a process for updating POS transactions with discounts |

Table 6 lists the steps of an exemplary algorithm process.

TABLE 6

ALGORITHM PROCESS REQUIREMENTS

| No. | Requirement Description |
|---|---|
| 1 | Algorithm Process<br>The system provides algorithms. |
| 2 | Rules<br>The system provides algorithms for processing consumer metadata.<br>The system provides algorithms for processing vendor product data.<br>The system provides algorithms for processing purchase transactions.<br>The system provides algorithms for transferring data. |

Table 7 lists the steps of an exemplary vendor configuration process.

TABLE 7

ANALYTICS REQUEST PROCESS REQUIREMENTS

| No. | Requirement Description |
|---|---|
| 1 | Analytics Request Process<br>The system provides analytics request capability. |
| 2 | SQL Query Process<br>The system provides capability for querying consumer metadata. |
| 3 | Standard and Custom Report Request Process<br>The system provides capability for standard and custom reporting of consumer metadata. |

The following describes exemplary interface requirements for interacting with users (e.g., consumers and vendors), such as through hardware, software and communication. Hardware, software and communication involve points where two or more systems meet and interact, and they are objects whose interaction with the outside world is defined by methods. The respective method forms the object's interface with the outside world. A simple example is a user requesting a subscription to a Spice Chip System where the user interfaces with the object, a database, through web interfaces in order to interact with the Spice Chip System.

Table 8 lists some exemplary interaction points and interfaces between the user and the system. As can be seen, one or more interfaces may be used depending on the desired interaction.

TABLE 8

USER INTERFACES

| Description | Interface 1 | Interface 2 |
|---|---|---|
| Customer Request to Subscribe | Web Page | |
| Vendor Information Data Entry | Database Application | |
| Vendor UPC Import | Database Migration Tool | |
| POS Price Change | SDK | |
| Vendor Request for Analytics/Reports | Web Page | SQL Queries |

Table 9 lists exemplary requirements for software interfaces, consisting of commands, codes, and messages that enable different applications to communicate with each other.

TABLE 9

SOFTWARE INTERFACES

| Application | Owner | Interface 1 | Interface 2 | Interface 3 |
|---|---|---|---|---|
| Customer Subscription | Spice Chip System | Web Page | Consumer Database | ISP |
| Smart Card Creation | Spice Chip System | Smart Card Software | Consumer Database | |
| Customer Profile Update | Spice Chip System | Web Page | Consumer Database | ISP |
| Vendor Information Data Entry | Spice Chip System | Web Page | Vendor Database | ISP |
| VendorUPC Import/Update | Vendor | Data Migration Tool | Vendor Database | ISP |
| POS Price Change | Retailer Association | Data Migration Tool | Retailer Database | ISP |
| Vendor Request for Analytics/Reports | Spice Chip System or Third-Party Partner | Visualization Software (e.g., TABLEAU) | Data Warehouse Software | ISP |

While various, embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

The art involves a system having an embodiment of data processing using processors and computer systems which output discounts to consumers at purchase. The output also produces data for querying and reporting manipulation which is received by vendors in the form of dashboards or in standard and custom reports. The Specifications detail various references to having the system output information to vendors in the form of query algorithms that support online queries and reports by vendors and are outlined in Table 10:

TABLE 10

OCCURRENCES OF ANALYTICS AND REPORTING DISCUSSION IN THIS SPECIFICATION

Figure 2:
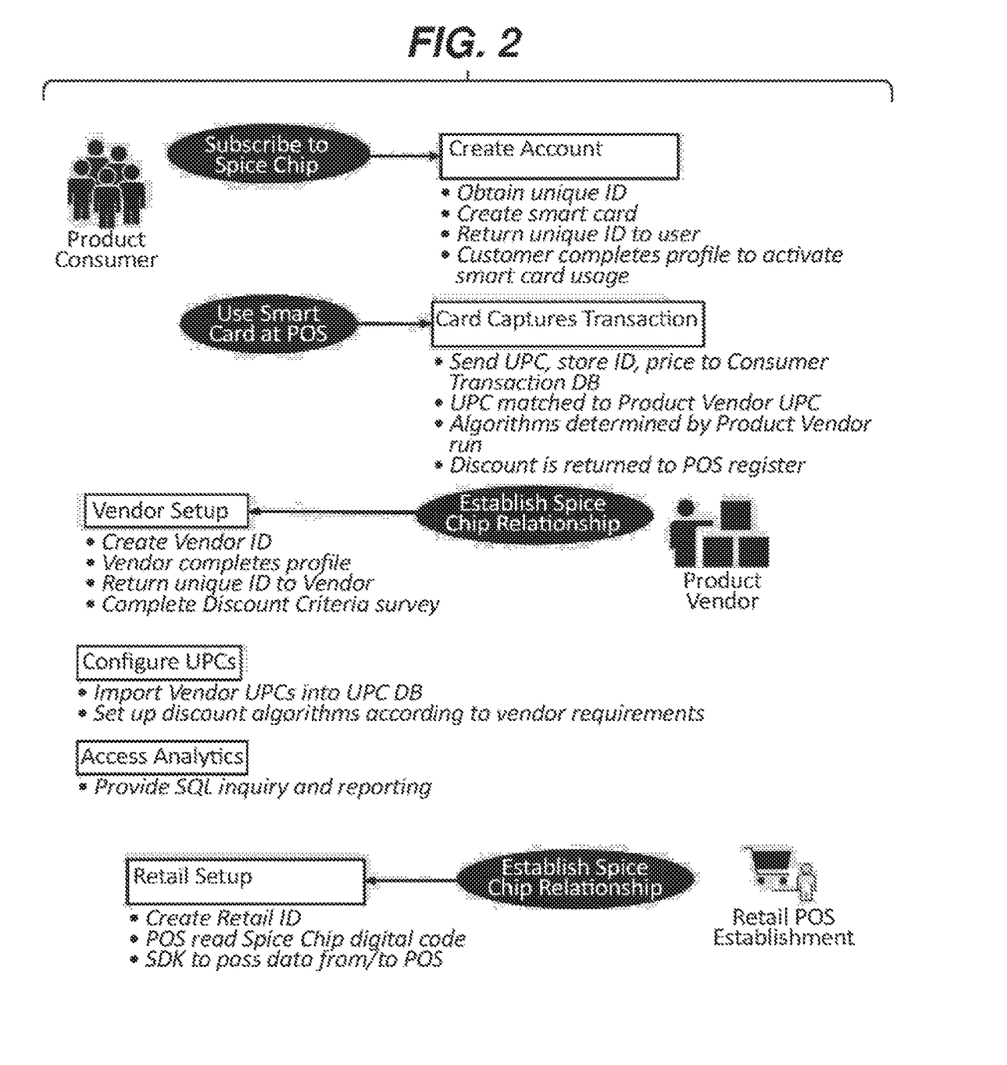
FIG. 2 is a block diagram illustrating connections and relationships of an exemplary Spice Chip System.

| Location | Description |
| --- | --- |
| FIG. 2 | In the 'Product Vendor Section' there is discussion about analytics and reporting |
| Table 1 | Data Definitions contains reference to 'Report Information' as a data entity |
| Table 2 | Functional Process Reports 10-14 relate to analytics and reporting outputs |
| Table 7 | Table devoted to analytics request process requirements |
| Table 9 | Software interfaces shows vendor request for analytics/reports |
| [0072] | Reference to reporting systems, vendor interfaces |
| [0080] | Describes data mining and query storage |
| [00114] | Data acquisition is not based solely on purchase transactions (historical) but also includes consumer input and ability to modify brand preference selections in ways that manipulate algorithms to yield different outcomes for discount or other future purposes vendors consider in analytics |
| [00117] | FIG. 8 illustrates information provided to vendors for querying/reporting comparisons |
| FIG. 8 | Sample data output on web screen of some data provided to vendors for querying/reporting comparisons |

The invention claimed is:

1. A method for preference-based data collection and discounting comprising:
   providing, by one or more processors, a consumer unique identifier;
   receiving, by the one or more processors, a list of products associated with the consumer unique identifier, wherein the order of the list of more than one product is identified;
   calculating, by the one or more processors, a discount multiplier for each product in the list of products, wherein the discount multiplier is based on the position of each product in the list of products;
   receiving, by the one or more processors, confirmation of the consumer unique identifier accessed at a transaction;
   accessing, by the one or more processors, the list of products associated with the identified consumer unique identifier;
   determining, by the one or more processors, if one of the products of the transaction are present on the list of products;
   applying, by the one or more processors, the discount multiplier to each individual product of the transaction based on the product's position on the list of products;
   modifying, by the one or more processors, the price of the transaction based on the applied discount multiplier; and
   updating, by the one or more processors, the list of products based on the specific products involved in the transaction by recalculating the discount multiplier for each product on the list based on an updated specific order.

2. The method of claim 1, further comprising, monitoring, by one or more processors, the list of products to determine if an alteration to the ordering of the list of products occurs.

3. The method of claim 1, further comprising, reordering, by one or more processors, the products on the list of products when a transaction is completed, wherein products involved in the transaction are removed from the list of products and the products remaining on the list of products are adjusted sequentially.

4. The method of claim 1, wherein, a logistic regression is applied to the list of products to determine the discount multiplier.

5. The method of claim 1, wherein the discount multiplier is calculated, by one or more processors, based on a predetermined equation associated with the position on the list of products.

6. The method of claim 5, wherein, the predetermined equation is either quadratic or linear.

7. The method of claim 1, wherein the discount multiplier may further comprise, calculating, by one or more processors, a variable based on a regression calculation for a predetermined number of positions on the list of products.

8. The method of claim 7, wherein the regression calculation is linear or quadratic.

9. A computer program product for preference-based data collection and discounting, the computer program product comprising:
   one or more non-transitory computer readable storage media and program instructions stored on the one or more computer readable storage media, the program instructions executed by a processor to perform tasks comprising:
   provide a consumer unique identifier;
   receive a list of products associated with the consumer unique identifier, wherein the order of the list of more than one product is identified;
   calculate a discount multiplier for each product in the list of products, wherein the discount multiplier is based on the position of each product in the list of products;
   receive confirmation of the consumer unique identifier accessed at a transaction;
   access the list of products associated with the identified consumer unique identifier;
   determine if one of the products of the transaction are present on the list of products;
   apply the discount multiplier to each individual product of the transaction based on the product's position on the list of products;
   modify the price of the transaction based on the applied discount multiplier; and
   update the list of products based on the specific products involved in the transaction by recalculating the discount multiplier for each product on the list based on an updated specific order.

10. The computer program product of claim 9, further comprising, program instructions to monitor the list of products to determine if an alteration to the ordering of the list of products occurs.

11. The computer program product of 9, further comprising, program instructions to reorder the products on the list of products when a transaction is completed, wherein products involved in the transaction are removed from the list of products and the products remaining on the list of products are adjusted sequentially.

12. The computer program product of claim 9, wherein, a logistic regression is applied to the list of products to determine the discount multiplier.

13. The computer program product of claim 9, wherein program instructions calculated the discount multiplier based on a predetermined equation associated with the position on the list of products.

14. The computer program product of claim 13, wherein, the predetermined equation is either quadratic or linear.

15. The computer program product of claim 9, wherein program instructions calculate a variable based on a regression calculation for a predetermined number of positions on the list of products for the discount multiplier.

16. The computer program product of claim 15, wherein the regression calculation is linear, or quadratic based on the regression calculation.

\* \* \* \* \*